United States Patent [11] 3,549,942

[72] Inventor Meinardus Antonius Gerardus Nijholt
Drachten, Netherlands
[21] Appl. No. 693,565
[22] Filed Dec. 26, 1967
[45] Patented Dec. 22, 1970
[73] Assignee U.S. Philips Corporation
New York, N.Y.
a corporation of Delaware. by mesne assignments
[32] Priority Dec. 31, 1966
[33] Netherlands
[31] No. 6618487

[54] CIRCUIT ARRANGEMENT FOR DELAYED CONNECTION OF A MAGNETRON TO THE HIGH VOLTAGE, AND INCLUDING AN RC NETWORK IN ITS INPUT CIRCUIT

6 Claims, 1 Drawing Fig.

[52] U.S. Cl. 315/102, 307/141, 307/293, 315/107, 317/141, 328/129
[51] Int. Cl. H05b 41/04 H01h 47/18
[50] Field of Search 315/102, 350, 355, 360, 103, 107; 328/72, 78, 86, 87, 129—131, 177, 75; 317/141, 142; 323/41; 307/293, 294, 141, 141.4; 321/37

[56] References Cited
UNITED STATES PATENTS
3,153,176 10/1964 Clay 317/142X

*Primary Examiner*—James W. Lawrence
*Assistant Examiner*—E. R. LaRoche
*Attorney*—Frank R. Trifari

ABSTRACT: Circuit arrangement for delayed connection of a magnetron to the high voltage, and including an RC network in its input circuit.

PATENTED DEC 22 1970 3,549,942
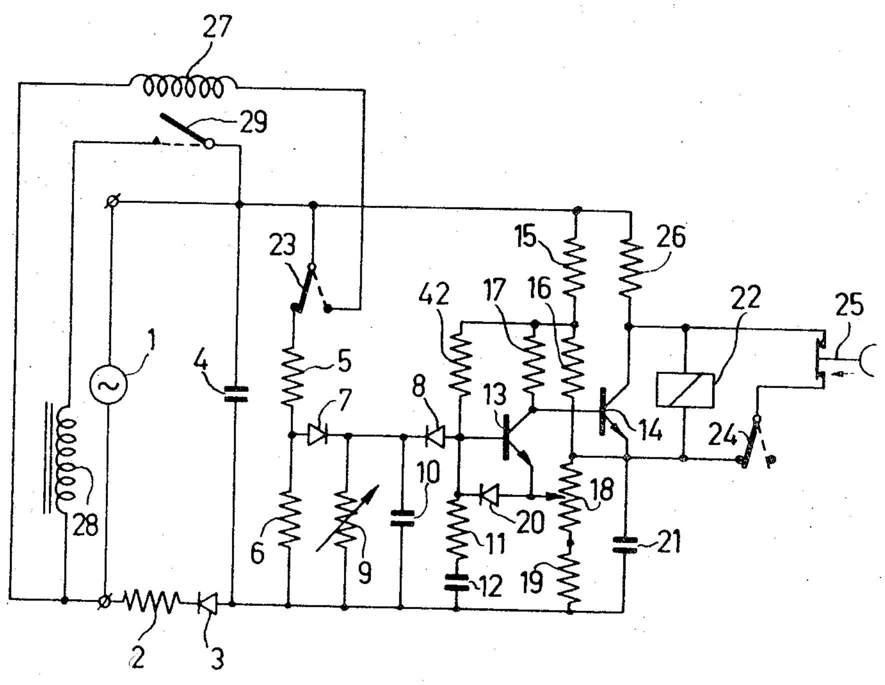
INVENTOR.
MEINARDUS A.G. NIJHOLT
BY
Frank R. Trifari
AGENT

CIRCUIT ARRANGEMENT FOR DELAYED CONNECTION OF A MAGNETRON TO THE HIGH VOLTAGE, AND INCLUDING AN RC NETWORK IN ITS INPUT CIRCUIT

The present invention relates to a magnetron timing circuit, more particularly to a circuit arrangement for delayed connection of a magnetron to the high voltage, and including in its input circuit an RC network and in its output circuit a control element for a switching relay which is transferred from one position to the other after a period of time determined by the RC network.

Such a timing circuit arrangement is known. Its principal object is to have a certain action take place for a defined period of time. For example, the rinsing or washing period in a washing machine may be determined with the aid of this circuit arrangement. In this manner it is also possible to control the period of heating in a high-frequency furnace.

A magnetron is often used as a generator in a high-frequency furnace. It is then desirable to connect the magnetron to the high voltage after the cathode has assumed a given temperature at which the density of the electron emission has reached a value which is usual for the relevant cathode.

An object of the invention is to start a given operation in a delayed manner. A particular object of the invention is to connect a magnetron to the high voltage in a delayed manner. The circuit arrangement according to the invention aims at preventing the high voltage from being connected to the magnetron without time delay after switching on the high-frequency furnace. The magnetron is thereby protected against damage.

To this end the invention is characterized in that the input circuit includes a second RC network and that the two RC networks are connected together through a unilaterally conductive element. According to a further characteristic feature the unilaterally conductive element is a diode, an electrode of which is connected to the control electrode of the active element in the input circuit of the timing circuit arrangement.

In one advantageous embodiment the second RC network is a series arrangement of a capacitor and a resistor, and the RC time constant of said network is shorter than that of the other RC network.

In order that the invention may be readily carried into effect it will now be described in detail, by way of example, with reference to the accompanying diagrammatic drawing which shows a circuit diagram of a timing circuit arrangement according to the invention.

In the circuit arrangement shown in the FIG., two RC networks are included in the input circuit of the timing circuit arrangement consisting of two transistor stages. One network is a parallel arrangement of a capacitor 10 and a variable resistor 9. The other network is the series arrangement of a capacitor 12 and a resistor 11. A relay coil 22 is connected parallel to the emitter-collector path of an NPN transistor 14 in the output circuit of the last transistor stage. The relay coil 22 controls both a switch 23 in the charge circuit of the RC network 9, and a switch 24 in the output circuit of the transistor 14. The voltage from an AC voltage source 1, rectified by a diode 3 and smoothed by a capacitor 4, feeds the timing circuit arrangement.

The circuit arrangement operates as follows. If pushbutton switch 25 is in the position indicated, then the relay coil 22 is short-circuited and the switches 23 and 24 are in the solid-line positions. The capacitor 10 is charged through the switch 23, a resistor 5, which forms part of a potentiometer build up of the resistors 5 and 6, and a diode 7. If the capacitor 10 is charged to such a value that the base voltage of the NPN transistor 13 becomes higher than the emitter voltage, adjusted by means of the potentiometer comprising resistors 15, 16, 18 and 19, then the transistor 13 becomes conductive. The voltage drop across the collector resistor 17 then becomes so high that the base voltage of the NPN transistor 14 becomes lower than the emitter voltage, adjusted by means of the potentiometer 15, 16, 18, 19. The transistor 14 changes from the conductive to the nonconductive state.

If the pushbutton 25 is moved in the direction indicated by the arrow then the relay coil 22 is energized. The switches 23 and 24 occupy the broken-line positions. In the first place the relay coil 22 will not be short-circuited even if the pushbutton 25 returns to its original position. In the second place a relay coil 27 is energized which in turn actuates a switch 29 so that a primary winding 28 of the high voltage transformer is energized. The high voltage is supplied to the load, in this case a magnetron, through the secondary winding (not shown) of the high voltage transformer.

The capacitor 10, which is no longer connected to the source 1, discharges through the resistor 9. After a period dependent on the RC time constant of the RC network 9, 10 the voltage across the capacitor 10 has decreased to a value such that the base voltage of the transistor 13 becomes lower than the emitter voltage. The transistor 13 changes from the conductive to the nonconductive state and the transistor 14 from the nonconductive to the conductive state. The relay coil 22 is a short-circuited and the switches 23 and 24 again occupy the solid-line positions. The coil 27 passes no current so that the switch 29 returns to the solid-line position. The high voltage at the magnetron is terminated. The period of timing during which the magnetron has been active is determined by the RC time constant of the circuit 9, 10.

It is often desirable to provide a time delay between the application of filament voltage to the cathode filament and the application of the high voltage. According to the invention this is accomplished by connecting the series arrangement of the resistor 11 and the capacitor 12 to the base of the transistor 13. Said series arrangement is also connected parallel to the RC circuit 9, 10 through the diode 8.

If the timing circuit is connected to the voltage source 1 and the pushbutton 25 is simultaneously moved in the direction of the arrow, then the relay coil 22 will not pass current for a period of time. In fact, the capacitor 12 is uncharged when the circuit is first switched on. The base potential of the transistor 3 is lower than its emitter potential. The transistor 13 is not conductive, the transistor 14 is conductive and the relay coil 22 carries no current.

The capacitor 12 is charged through the resistor, 15, 16, 18, and diode 20 and the resistor 11. After a period of time determined by said resistors and the capacitance of the capacitor 12, the latter is charged to such a value that the base potential of the transistor 13 becomes higher than the emitter potential. The transistor 13 changes to its conductive state and the transistor 14 changes to its nonconductive state. A current flows through the relay coil 22, the contact 23 changes to the broken-line position and the high voltage is switched on. The high voltage remains switched on for a period determined by the RC time constant of the network 9, 10.

The diode 8 prevents the voltage across the capacitor 10 from influencing the charging of the capacitor 12. In other words, the charge circuits of the capacitors 10 and 12 are separated.

The diode 8 becomes conductive if the voltage across the capacitor 10 drops below the voltage across the series arrangement of resistor 11 and capacitor 12. This will be the case when the capacitor 10 has partly discharged across the resistor 9, so some time after the high voltage has been switched on. If the voltage across the capacitor 10 and hence the base potential of the transistor 13 has decreased to such a value that the base potential has dropped below the emitter potential of transistor 13, the latter changes again to its nonconductive state and the high voltage is switched off.

In one embodiment the resistors 2, 5, 6, 15, 16, 17, 18, 19, 11, 42, 26 were 100Ω15 kΩ1600Ω82 kΩ2 kΩ22 kΩ500Ω 390Ω100 kΩ1.5 mΩand 20 kΩrespectively. The capacitors 4, 10, 12 and 21 were 16μf., 800μf., 10μf., and 10μf., respectively. The diodes 7, 8 and 20 were of the type OA 202, the diode 3 was of the type BYX 10. The transistors 13 and 14 were of the types BC 109 and BC 107, respectively.

The resistor 9 was adjustable between 15kΩand 2MΩ.

I claim:

1. A delay circuit for connecting a magnetron to a source of high voltage comprising, a source of direct current, relay means for selectively connecting said magnetron to said high voltage source, a control element having an output circuit coupled to said relay means and an input circuit, a first resistor and a first capacitor connected to form a first RC timing network, a second resistor and a second capacitor connected to form a second RC timing network, a diode, means connecting said first and second RC networks together by means of said diode, first means connecting said first RC network to said direct current source and to the input circuit of said control element to actuate said relay means via said control element so as to provide the sole control of the time period during which the magnetron is connected to the high voltage source, and second means connecting said second RC network to said direct current source and to the input circuit of said control element so as to actuate said relay means via said control element to provide a predetermined time delay before said high voltage source is connected to the magnetron.

2. A circuit as claimed in claim 1 wherein said control element includes a control electrode directly connected to one terminal of said diode, said diode being poled so as to separate the charge circuits of said first and second capacitors.

3. A circuit as claimed in claim 1 wherein said second capacitor and said second resistor are connected in series circuit, the RC time constant of the second RC network being shorter than the RC time constant of the first RC network.

4. A circuit is claimed in claim 1 wherein said first capacitor and said first resistor are connected in parallel, said circuit further comprising a switching contact controlled by said relay means, a second diode, and means connecting said switching contact and said second diode in series with said first RC network across the terminals of said direct current source.

5. A circuit as claimed in claim 1 wherein said first capacitor and said first resistor are connected in parallel and said second capacitor and said second resistor are connected in series, said first and second RC networks being connected in parallel with one another across said direct current source via said diode.

6. A circuit as claimed in claim 5 wherein the capacitors and resistors of said first and second RC networks are chosen so that the RC time constant of the second RC network is shorter than the RC time constant of the first RC network.